United States Patent [19]

Johnson et al.

[11] 4,107,467

[45] Aug. 15, 1978

[54] ELECTRONIC ORDER PLACEMENT SYSTEM USING SIGNALS OVER TELEPHONE LINE

[75] Inventors: Clifford Carl Johnson, Arlington Heights, Ill.; Vincent Elliott Eitzen, Marco Island, Fla.

[73] Assignee: American Hospital Supply Corporation, Evanston, Ill.

[21] Appl. No.: 804,884

[22] Filed: Jun. 9, 1977

[51] Int. Cl.² ............................................. H04M 11/00
[52] U.S. Cl. ................................................. 179/2 DP
[58] Field of Search ..................................... 179/2 DP

[56] References Cited

U.S. PATENT DOCUMENTS

| | | | |
|---|---|---|---|
| 3,359,369 | 12/1967 | Di Iorio et al. | 179/2 DP |
| 3,549,809 | 12/1970 | Stehr | 179/2 DP |

*Primary Examiner*—George G. Stellar

*Attorney, Agent, or Firm*—Tilton, Fallon, Lungmus & Chestnut

[57] ABSTRACT

Punched cards, used to identify items to be ordered from a central location, are selected and placed in a card reader which is located at the subscriber. Information may also be entered manually by a keyboard. In either case, the information is encoded into tone signals which are transmitted to the central location for recording and verification. When an "accept" tone signal is returned to the subscriber, indicating that the previously transmitted block of data has been received and found to be acceptable, a card feed signal actuates the card reader to feed the next card. If a "reject" tone is returned, indicating that the data received was unacceptable, the operator may enter data manually via the keyboard, re-run the card that had not been accepted, or simply skip the rejected card. The system is compatible with existing telephone communication equipment.

13 Claims, 3 Drawing Figures

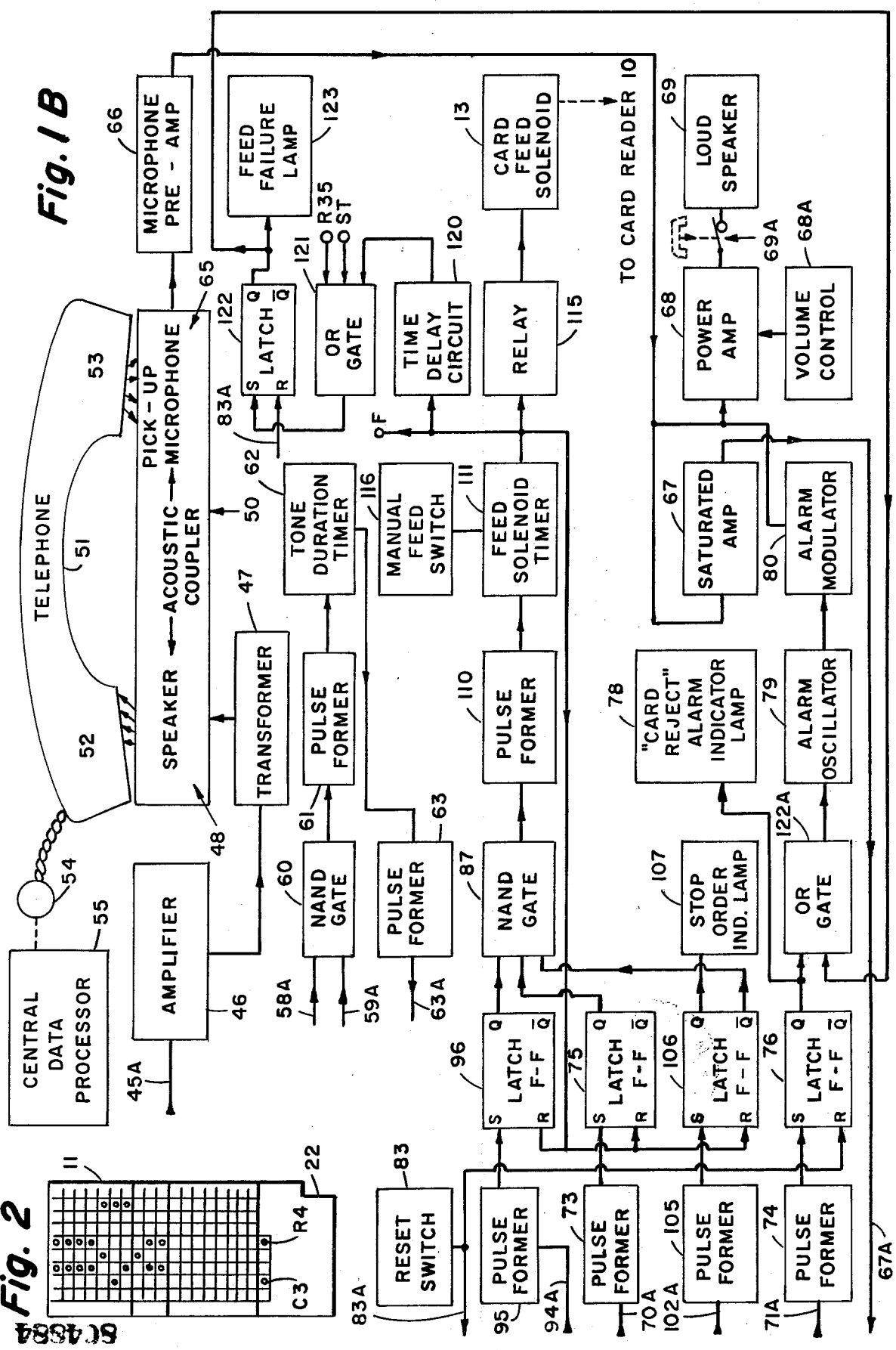

ELECTRONIC ORDER PLACEMENT SYSTEM USING SIGNALS OVER TELEPHONE LINE

BACKGROUND AND SUMMARY

The present invention relates to electronic communication systems employing existing telephone lines; and more particularly, it relates to a system for quickly and conveniently transmitting data representative of an order desired to be placed.

The present system is designed to be used in situations where a limited number of known purchasers use the telephone to place orders with a central location, especially when orders are placed frequently. An example might be a number of hospitals ordering materials from a supplier. This situation is distinguished from that of a retail catalog sales organization taking orders from thousands of customers who may or may not be repeat customers, but for the most part, do not re-order the same items frequently, even if they are repeat customers.

One way in which the order taking from frequent repeat customers is accomplished currently is simply that the orders are placed by a person orally over the telephone to a remote, central location. If the operation is large enough, the supplier may lease WATS lines from a number of larger cities to reduce the cost of telephone order placement. Nevertheless, because of the need to manually record the order at the central location, and the need to place the order orally by the purchaser or "subscriber", considerable expense is incurred just in the telephone usage.

There are existing systems which transmit data from remote locations or subscribers to a central location through existing telephone communication channels and using tone signals. One such system is disclosed in U.S. Pat. No. 3,723,655 entitled "Credit Authorization System Terminal" in which subscribers such as restaurants or stores transmit data to a central processor which determines whether credit is to be authorized to a customer. In this system, a telephone connection is established automatically, and once the customer's identification data is transmitted, the terminal operator uses a keyboard to enter the dollar amount of a transaction, and the computer, upon receipt of all of the data, checks stored data and transmits one of four possible display codes for the user including (1) READY, that is, credit is accepted; (2) INCOMPLETE, that is, re-execute the information; (3) CALL, indicating the terminal operator to call the remote processor for explanation, or (4) DO NOT SELL, indicating the customer's credit is not acceptable. This system does not offer the flexibility and convenience of assembling an order from an existing set of cards in an order deck, and transmitting the order to the central location with acceptance or rejection signals returned as the information on each card is verified, the "accept" tone being used to actuate the card reader to read the next card. The credit card system is designed to read a single card only and to transmit signals back to the subscriber representative of a limited number of options which are displayed.

In U.S. Pat. No. 3,937,889, a data transmitter is capacitor-coupled to a bridge tap at a subscriber's handset so that it is direct-wired to the remote terminal telephone line. Data from transducers or keyboards is transmitted at frequencies outside the voice band to the telephone central office or to a central processor.

In U.S. Pat. No. 3,889,062, data terminals are coupled via telephone lines to a central computer which controls the connection of an acoustic coupler to a keyboard, a printer and the computer. U.S. Pat. No. 3,932,709 discloses a business telephone for the transmission and receipt of voice messages and digital data which includes a computation mode wherein the data terminal is electronically interfaced with the remote computer. U.S. Pat. No. 3,505,474 discloses a portable computer terminal with an acoustic coupler which sends and receives digital data in teletypewriter code to and from a central computer. Data is transmitted by means of a keyboard, and it is displayed through a printer at the remote terminal.

SUMMARY OF THE INVENTION

The present invention is directed to apparatus for communicating with a central processor which is capable of returning "accept" or "reject" signals in response to the reception of subsets of data (i.e., the data on each individual card) received from subscribers. Each subscriber location is provided with a card order deck comprising a number of individual punched cards, each card bearing machine-interpretable data representative of a known item to be ordered, for example. In a preferred embodiment, to facilitate compatibility of the punched order code with the "2 of 7" code in a tone signals encoder, each card has eight columns where apertures might conceivably be punched. Thus, each row of eight bits comprises a character. Seven bits are used to generate a "2 of 7" code used to actuate a tone encoder when the keyboard is not being used, and the eighth bit is used to indicate a "stop order" command. The last row on each card is reserved, irrespective of the number of preceding items, for an "End-of-Card" character, or simply, an EOC signal.

The operator selects the cards from the order deck corresponding to those items and quantities which he desires to order at a given time, and he places these order cards in a vertical stack in an input hopper of a card reader. Thus, the stack may be modified or supplemented during data transmission, if desired.

Initial communication is established through a conventional telephone handset (rotary or pushbutton dial) with a remote central data processor. In a dial tone dialing area, card dialing may be used, if desired, to dial the number of the computer. In either case, the telephone handpiece is placed in an acoustic coupler.

Once communication is established and the telephone handpiece is in place, the operator at the subscriber station begins transmission of the order data by actuating a "Manual Feed Switch" which causes the first card to be read. This card contains customer identification data and a "Stop Order" code. The feeding of cards is interrupted in response to the "Stop Order", and data may be entered manually through a keyboard after an "accept" tone indicates verification of the customer identification data. Such manually entered information may be an order number. The keyboard may be a conventional telephone dialing keyboard with 12 push buttons arranged in four rows and three columns. A "2 of 7" code is used to signify a character including one row signal and one column signal, as is done in conventional telephone tone dialing systems. After the manual data is entered and accepted, the operator initiates automatic card reading in sequence.

The input signals, whether received from photodetectors reading the cards or from the keyboard are coupled to pulse forming networks for shaping the pulses, and the resulting signals are used to set corresponding latch circuits. The outputs of the latch circuits are coupled to a conventional "2 of 7" tone signal encoder which generates the tones transmitted to the computer through the acoustic coupler, local telephone hand set and established link. Reset circuitry comprising a loop senses the outputs of the latch circuits and actuates a timer circuit which, after a lapse of predetermined time, resets the latch circuits, thereby ending the tone being transmitted. Thus, the duration of tones transmitted has a uniformity and is independent of errors in the card transport mechanism, for example.

When the information is received, the computer sends back either an "accept" or a "reject" signal. Preferably, these signals are also tones. If an "accept" tone is received by the subscriber, after an EOC signal has been sent and provided a "Stop Order" code has not been detected by the reader, a FEED signal is generated and coupled to the card reader to cause the next card to be read.

A local loudspeaker is connected to the microphone in the acoustic coupler by means of a switch which is actuated when the telephone handpiece is placed in the coupler so that both the transmitted and the received tones may be heard as they occur. This gives the operator an audible indication that the system is working.

If the operator wants to transmit additional information manually, he may do so either before he presses the FEED button to commence automatic reading of cards, or between the reading of any two sequential cards (by pressing a STOP button) or after the last item card has been read but before an End-of-Order card (explained further below) is read.

If a "reject" signal is received from the central processor, the operator may enter data manually via the keyboard, or he may re-run the card not accepted, or he may simply skip the rejected card by actuating a manual feed switch to manually generate a card feed signal and continue subsequent automatic operation.

After all the individual order cards are read, and the information is transmitted, an End-of-Order card is read, having been placed on the top of the stack by the operator. This will notify the central data processor that the order is completed, and upon receipt of a final ACCEPT tone, the telephone handpiece is removed from the acoustic coupler on the operator and returned to its cradle, and transmission is terminated.

The system includes other signal indicators, such as visual indicators and audible alarms to facilitate detection of alarm conditions or to indicate the status of the system; but these are best understood in light of the complete circuit description.

The present system thus provides for the sequential transmission of data prepared on punched cards wherein each card represents a separate order item so that a complete order can be prepared by selecting cards. The system takes advantage of existing telephone lines and is completely compatible with them; yet it greatly reduces the time of use of such lines when compared with the oral transmission of orders. Further, once the order information is transmitted, it is already in a form readily acceptable to a computer so that card-punching on the receiving end is unnecessary and the computer may directly prepare a printout and order verification form if desired.

Other features and advantages of the present invention will be apparent to persons skilled in the art from the following detailed description of a preferred embodiment accompanied by the attached drawing wherein identical reference numerals will refer to like parts in the various views.

THE DRAWING

FIGS. 1A and 1B together comprise a function block diagram of a system incorporating the present invention; and FIG. 2 illustrates a typical card used in the system.

DETAILED DESCRIPTION

Figure 1A:
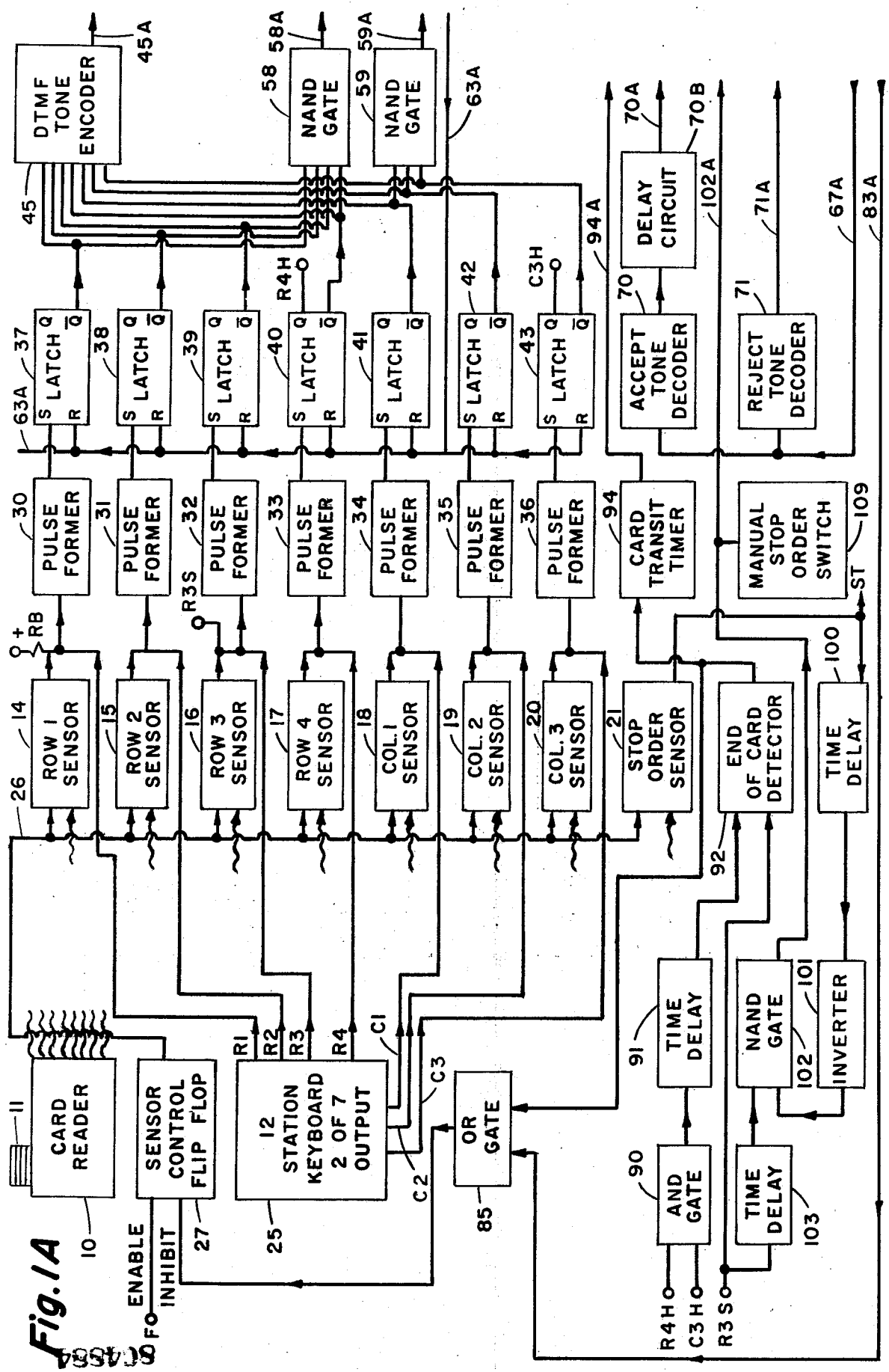

An optical card reader 10, such as is disclosed in application Ser. No. 804,883, filed June 9, 1977, for "Optical Card Reader Apparatus", of Eitzen, et al, which is incorporated herein by reference, processes the cards sequentially.

Briefly, the card reader 10 includes a supply hopper in which is placed a stack of cards 11 (such as the one designated in FIG. 2), selected from an order deck according to the items desired to be purchased, and they are stacked vertically in the supply hopper, thereby facilitating modifying or adding to the order during processing. The cards are fed from the bottom of the stack by means of a plunger which is actuated by a card feed solenoid (see reference numeral 13 of FIG. 1B). Each of the cards is then passed in sequence by a card transport over an array of photodetectors or sensors which are spaced laterally apart at a distance corresponding to the spacing of the columns on the card 11. These photodetectors are represented by the sensors 14–21 in FIG. 1A. A source of light is arranged on the side of the sensor opposite the sensor so that the sensor is actuated when an aperture in the card passes over it and the light (diagrammatically indicated by the wiggly arrows into the sensors) is incident on the active area of the photosensor. The sensors are also activated between the time the feed solenoid is energized and the time the leading edge of a card covers the sensors, and circuitry is included to account for this since it conveys no information.

The card 11 may be of white opaque vinyl acetate, having a thickness of 0.030 inches. A notch 22 is located in one corner to provide correct orientation in the supply hopper. Holes are punched in a matrix having eight columns (running top to bottom in FIG. 2) spaced 0.2 inches apart; and space is provided for 19 rows running side-to-side and spaced 0.2 inches apart along the length of the card.

A numeric code is used to symbolize information on the card including numerals 0 through 9 which are represented by punching two out of seven possible holes in the first seven columns starting from the right side of the card. This 2 of 7 code corresponds to the same code on a conventional 12-station telephone keyboard, such as the one designated 25 in FIG. 1A which is used for manual entry of data into the system.

Referring back to the card of FIG. 2, the eighth column is reserved for a special "stop order" character which inhibits subsequent automatic feed operation. The last character of each card comprises holes punched in the fourth and seventh columns (locations R4 and C3) designating an End-of-Card (EOC) signal. A portion of the card is reserved for written or printed information to identify readily what is contained on the card. The code of apertures on the card 11 is related to the code generated by the keyboard 25 as follows. The keyboard 25 has four rows (R1, R2, R3 and R4) and three columns (C1, C2 and C3). The first seven columns of the card 11 are designated R1, R2, R3, R4, C1, C2 and C3 respectively. When one of the 12 keys on the keyboard 25 is depressed, two switches are closed corresponding to one row and one column. Associated with the four rows of the keyboard are four continuous wave signal generators or oscillators, each of a different frequency; and similarly, three frequency generators are associated with the three columns. When one of the keys is depressed, two switches are closed, actuating circuitry controlling the respective frequency generators as explained below. Mixing of the two selected frequencies yields a tone signal such as is used in standard telephone dialing. Twelve combinations of frequencies are possible including the ten numerals 0 through 9 and two contrl functions, conventionally represented by the asterisk (*) and the pound or space (#) symbols.

Referring now to FIG. 1A, each of the sensors 14–21, in order to be operative is fed an "Enable" signal along a line 26 from a sensor control circuit 27 which may be a flip-flop circuit. The sensor control circuit 27 receives two inputs— an "Enable" input designated F, and an inhibit input, both of which will be more fully described below.

The output signals of the first seven sensors 14–20 are connected respectively to pulse former circuits 30–36. The pulse former circuits are conventional circuits designed to eliminate transients such as might be caused by contact bounce and to establish a definite binary output signal level.

The output signals R1 through R4 of the keyboard 25 are coupled respectively in parallel with the sensors 14–17 to the pulse formers 30–33; and the column output signals C1-C3 of the keyboard 25 are coupled in parallel respectively with the column sensors 18–20 to the inputs of the pulse formers 34–36 respectively. Although not shown, the circuits may be used to electrically isolate the keyboard outputs from the sensor outputs, but a logical "OR" function is performed with the associated pairs of outputs, as illustrated diagrammatically.

Thus, for each character entered, whether it is entered by means of the card reader or the keyboard 25, the pulse former circuit 30–36 transmit two "low" or "0" signals and five "high" or "1" signals.

The output signals of the pulse formers 30–36 are connected respectively to the set input terminals of latch flip-flop circuits 37–43 respectively; and the complementary or $\overline{Q}$ outputs of the latch circuits 37–43 are connected to the seven input terminals of a tone signal encoder 45 which is a commercially available crystal controlled integrated circuit module manufactured by Motorola, Inc. under the designation MC14410, which produces a predetermined tone signal (two frequencies mixed) when a ground potential is established on any two of its eight input terminals (only seven of which are being used in the illustrated embodiment). Since the $\overline{Q}$ outputs of the latches 37–43 are normally at a logical high potential, these output terminals may be connected directly to the tone signal encoder 45. Thus, insofar as the latch circuits 37–43 and the tone signal encoder 45 are concerned, it makes no difference whether the information was generated by the card reader or the keyboard 25.

The output of the tone signal encoder 45 is coupled via line 45A through an operational amplifier 46 (FIG. 1B) and a transformer 47 to a speaker 48 in an acoustic coupler 50. The acoustic coupler 50 is designed to receive a telephone handpiece 51 including a transmitter 52 and receiver 53. The sound from the speaker 48 of the acoustic coupler 50 is coupled to the transmitter 52 of the handpiece 51; and the tone signals are thus transmitted over telephone lines 54 to a data processor 55 which may be centrally located relative to a number of subscribers of the type being disclosed herein.

Thus, by way of summary, when any two input terminals of the tone encoder 45 are energized with a relatively low voltage or ground from two of the latches 37–43, a tone is generated and transmitted until the two latches are reset to drive the input terminals of the tone encoder to a relatively high voltage. In order to make the tone time uniform, reset loop circuit means are provided including a first NAND gate 58 having four inputs received respectively from the $\overline{Q}$ outputs of the latch circuits 37–40 and a second NAND gate 59 having three inputs received respectively from the $\overline{Q}$ outputs of the latch circuits 41–43. The output signals of the NAND gates 58, 59 are coupled by lines 58A and 59A respectively to the two inputs of a NAND gate 60. The output of the NAND gate 60 is coupled through a pulse former circuit 61, similar to those already described for generating a constant level output, to a tone duration timer circuit 62 which may be a conventional monostable circuit responsive to an input signal for generating an output signal of constant time duration. The output of the tone duration timer circuit 62 is coupled through a pulse former circuit 63 and a line 63A to the reset input terminals of the latch circuit 37–43 of FIG. 1A. Thus, the trailing edge of the pulse from the tone duration timer circuit 62 is used to reset all of the latch circuits 37–43 to their reset states a predetermined time after the coincidence of two tone selection signals, one representative of a selected row and the other representative of a selected column in the keyboard matrix or the card sensor system.

The acoustic coupler 50, in addition to the speaker 48 includes a pick-up microphone 65 which senses the side-tone in the handset 51 during the transmission of signals, and transmits the tone through a pre-amplifier 66 to a saturated amplifier 67 and a power amplifier 68. The power amplifier feeds a loudspeaker 69 through a normally open switch 69A so that the operator at the subscriber can hear whether tones are being transmitted through the handset 51. The switch 69A is located under the receiver bracket, and it is closed when the telephone handset is placed in the acoustic coupler. This avoids acoustic feedback which would otherwise cause audible oscillation if the handset were not in the acoustic coupler. A manual volume control 68A may be provided to adjust the gain of the power amplifier 68 to control the volume output of the speaker 69. Thus, all of the signals to and from the remote central processor 55 are also audible to the operator at the remote subscriber by means of the loudspeaker 69.

When the data is transmitted to the central data processor 55 for each card, the central data processor returns one of two tone signals: an "accept" tone or a "reject" tone. These signals are coupled through the microphone 65, pre-amplifier 66, and saturated amplifier 67 to a line 67A which is connected to the inputs of an accept tone decoder 70 and a reject tone decoder 71 (FIG. 1A). The tones are also heard over the loudspeaker. The tone decoders 70, 71 are conventional phase-locked loops which function as bandpass filters, the bandwidth being a function of input signal amplitude. The accept tone decoder 70 is, of course, tuned to the "accept" tone frequency received from a central data processor 55 and the reject tone decoder 71 is similarly tuned to the "reject" tone frequency.

The output signals (FIG. 1A) of the accept tone decoder 70 (through a delay circuit 70B) and the reject tone decoder 71 are coupled by means of lines 70A and 71A respectively to the inputs of pulse former circuits 73 and 74 in FIG. 1B. These pulse formers are similar to the ones already discussed, and their outputs are connected respectively to the set input terminals of latch circuits 75, 76.

In the case of a reject tone, the Q output of the flip-flop 76 is coupled to a "Card Reject" indicator lamp 78 and through OR gate 122A to the input of an alarm oscillator circuit 79 which generates a continuous, fixed-frequency signal which is coupled through an alarm modulator circuit 80 to the amplifier 68, and ultimately to the loudspeaker 69 from which it is heard as a periodically intermittent audible tone, clearly recognized as an alarm signal. The alarm signals, both audible and visual, may be turned off by means of a reset switch 83 which is a manually actuated switch for resetting the flip-flop 76. This manual reset signal is also coupled through a line 83A and an OR gate 85 (FIG. 1A) to the inhibit input of the sensor control flip-flop 27 to permit the operator to manually enter data into the system by means of the keyboard 25, if he desires.

Automatic Card Feeding

In order to continue in the automatic card feeding mode, three conditions are required. These three conditions are represented by electrical signals presented to the three inputs of a NAND gate 87 in FIG. 1B. One of the signals, received from the previously described latch flip-flop 75 represents the detection of an "accept" signal from the central data processor. This indicates that the information previously transmitted to the central data processor has been accepted following an EOC character of a previously read card.

The second condition necessary for feeding the next card is that the previously read card be sufficiently clear of the bottom of the deck as to permit the next card to be fed into the card transport. The holes R4 and C3 representing the EOC character in FIG. 2 are always punched at a predetermined location on the card 11. This information together with the known feed rate of the cards, the desired spacing between consecutive cards, and the time interval required after the detection of and EOC character, will determine the initiation of feeding of the next card.

Due to the inherent differences in sensor response time and the possibility that the leading edge of a card may not be truly parallel to the axis of the sensor array, errors may arise as the leading edge of a card passes over the sensors such that the eight sensors do not all become inactive simultaneously. If the two positions corresponding to the EOC character are the last to become inactive when a leading edge of a card crosses the sensors, it is possible to generate a false EOC signal. Further, it will be appreciated that all sensor positions are illuminated in the interval between cards. Hence, provision is made to insure that an error does not occur by connecting the output R3S of sensor R35 directly to an End-of-Card detector 92, which may be a NAND gate. A time delay circuit 91 receives the output of the AND gate 90 and is coupled to the other input of an End-of-Card detector 92. The Q outputs R4H of the latch 40 and C3H of latch 43 are coupled to the inputs of AND gate 90. Following the voltage levels through the circuitry being described, the output terminals of the sensors 14-21 are normally biased at a positive or "high" level through a bias resistor, one of which is shown at RB in FIG. 1A. The output actuating signal 26 from the sensor control flip-flop 27 is a "low" or ground signal. Hence, when a sensor is energized by incident light energy, its internal resistance becomes relatively low and its output signal is a negative-going spike. Polarity is not reversed in the pulse former circuits, and the latches are set on a negative leading edge. Thus, the signals R4H and C3H are positive when an EOC character is being read; and similarly, the R3S signal is positive only when the Row 3 sensor is not being illuminated, indicating that a true EOC character is being sensed, not the interval between cards when all sensors are illuminated.

This EOC signal is coupled to a Card Transit Timer circuit 94, the output of which is coupled by means of line 94A to a pulse former 95 on FIG. 1B and thence to the set input of a latched flip-flop 96, the Q output of which forms the second input of the NAND gate 87. The function of the Card Transit Timer 94 is to delay the transmission of the EOC signal to the latch 96 for a predetermined time to allow the card being read to pass from the card reading station and to permit a desired interval before feeding the next card.

The third input of the NAND gate 87 is a signal which is designed to insure that a "Stop Order" signal has not been generated. A Stop Order is sensed by the eighth (i.e., left-hand column in FIG. 2) position sensor 21, and its output signal is fed to a time delay circuit 100 which performs a function similar to that of the previously discussed time delay circuit 91, which is to avoid errors which would otherwise be caused by the misalignment of the leading edge of a card or by sensor response differences. The output of the time delay circuit 100 is fed to an inverter circuit 101, the output of which feeds a NAND gate 102. The other input of NAND gate 102 is received from a time delay circuit 103, the input of which is the signal R3S. Tus, the output of NAND gate 102 is a signal representative of the fact that the Stop Order sensor 21 has been actuated and that at least one other sensor (whose signal has been momentarily delayed by the time delay circuit 103) is inactive. This insures that only the stop sensor is actuated; and the resulting stop order signal is transmitted along a line 102A through a pulse former 105 (FIG. 1B) to the set input of a latch circuit 106. The Q output of the latch circuit 106 is fed as the third input of the NAND gate 87. The Q output of the latch circuit 106 is directly connected to a stop order indicator lamp 107 to provide a visual signal that a Stop Order has been sensed.

A Stop Order signal may also be initiated manually by means of a switch 109 (FIG. 1A) which is coupled to the output of the NANd gate 102—namely, the line 102A.

To summarize, the NAND gate 87 generates a signal which indicates first, that an EOC signal had been detected from a previously read card; secondly, that the information on that card had been accepted by the central data processor and an "accept" tone had been received; and thirdly, that a "Stop Order" signl had not been generated. When these conditions occur, the output signal of the NAND gate 87 is fed through a pulse former cirucit 110 to a feed solenoid timer circuit 111.

The output of the feed solenoid timer circuit forms a signal denoted F which also forms the enable signal input of the sensor control flip-flop 27 shown in the upper left-hand portion of FIG. 1A. The feed solenoid timer generates an output signal for a predetermined time sufficient to feed the next card from the bottom of the input hopper of the card reader so that it is picked up by the card transport mechanism, described in the above-referenced application. This signal is fed to energize a relay 115 which, in turn, actuates the previously described card feed solenoid 13. Card feed can also be initiated manually be means of a manual feed switch 116 which energizes the feed solenoid timer 111.

If a card fails to feed over the sensor array, or if the card supply hopper becomes empty and the operator had neglected to include a "Stop Order" code, circuitry is provided for alerting the operator. This circuitry includes a time delay circuit 120 (shown in the center right side of FIG. 1B) which is actuated by the feed signal F. The output of the time delay circuit 120 feeds one input of an OR gate 121. The other inputs of the OR gate 121 are received respectively from the Row 3 Sensor, R3S previously described and from the output of the Stop Order sensor 21. This signal is designated ST.

The output of the OR gate 121 is connected to the set input of a latch circuit 122; and the reset input of this latch circuit is received from the reset switch 83, the line being designated 83A on the left margin of FIG. 1B. The Q output of he latch circuit 122 is connected to a feed failure lamp 123 to energize it, and it is also connected through OR gate 122A to the input of the alarm oscillator 79.

The circuitry just described operates as follows. When the feed solenoid timer 111 completes its time, the time delay circuit 120 is actuated to allow a preset time for a card to be read. If, at the end of the time delay determined by the time delay circuit 120, the Row 3 sensor and the order sensor are still illuminated, it indicates that no card is positioned above the sensor array since the two signals cannot occur at the same time unless all sensors are being energized by the incident light. Thus, a signal will appear at the output of the OR gate 121 to set the latch 122, thereby energizing the feed failure lamp 123 and the periodically intermittent audible alarm, described above, which is sounded through the loudspeaker 69. The latch 122 may be reset by the manual reset switch 83, thereby terminating the alarm signal. The feed solenoid timer energizes the feed solenoid for a predetermined time. Although not illustrated, an "Automatic Feed" indicator lamp may be energized by the output of pulse former 110 and a "Manual Feed" indicator lamp may be energized by the Manual Feed Switch 116 to inform the operator of the mode of operation.

Operation

The user at the subscriber selects cards from a large file or order deck, for example, up to 100 items may be ordered at one time. A customer identification card containing a "Stop Order" code is included as the first card in the stack and an "End-of-Order" card is added as the last (top). The stack is placed into the input hopper of the card reader 10, which is running. The customer places the handset in the acoustic coupler and dials the number that will connect the subscriber station with the central data processor. A tone heard over the loudspeaker indicates that the processor is on line. If the processor is inoperative, a voice recording may be transmitted indicating an estimate of the time at which serve will be restored. Next, the operator actuates the manual feed switch 116 which causes the customer identification card to be read by actuating the card feed solenoid 13. The information detected by the sensors 14-20 is stored in the latches 37-43 and encoded by the dial tone encoder 45. Corresponding tone signals are transmitted from the speaker 48 through the telephone pick-up 52 to the central data processor until the "Stop Order" character is detected in the sensor 21. Upon this detection, and since the card is still covering the sensors (that is, signal R3S is positive), the NAND gate 102 will generate a signal along line 102A to cause latch 106 to be set, thereby disabling NAND gate 87, and interrupting the automatic feeding of cards.

The computer verifies the identification and if it is correct, returns an "accept" tone, which is detected at the pick-up microphone 65 of the acoustic coupler 50 and fed through the pre-amplifier 66, the amplifier 67 and the line 67A to the accept tone decode 70. The output signal of the accept tone decoder 70A causes the latch 75 to be set. The customer then dials a purchase order number on the keyboard 25 and whatever other information may be necessary for his records, and again awaits verification from the central data processor. Upon hearing an audible "accept" tone from the data processor, he again presses the manual feed switch 116, thereby actuating the card feed solenoid 13 and the first item order card is fed through the card reader 10. Alternatively, upon hearing the "accept" signal, he has the option of entering, at the start of an order, information that had not been included in his order stack. This information would be entered by the keyboard 25.

Each card contains an EOC character, and as it is detected in the End-of-Card detector 92, the card transit timer 94 is actuated to set the latch 96 after a predetermined time has lapsed, insuring the complete reading of the card. It will be observed that the previous feed signal F had reset each of the latches 96, 75 and 106. The latch 106 had been set prior to this time because a stop signal had not been received. Further, the latch 75 had been set because an "accept" tone had been received and decoded in the accept tone decoder 70, provided no errors had been detected or occurred. The delay circuit 70B delays the "Accept" signal for a time at least as long as the duration of the accept tone to prevent transmission coincidence with the actual accept tone.

If the customer desires, a Stop Order character may be used at the end of the end-of-order card of an order prior to the end-of-card signal. This will be detected by the Stop Order sensor 21 and associated circuitry described above, and the resulting signal from the NAND gate 102 is used to set the latch 106, thereby inhibiting the NAND gate 87, so that a final alarm tone will be prevented.

If an error occurs and is detected, due for example, to problems such as damaged cards, incomplete order data, improperly punched cards, or a discontinuity in telephone transmission, the data processor will transmit a "reject" signal. This signal, which could occur after any EOC signal, is detected in the reject tone decoder 71 which sets the latch 76 (FIG. 1B), thereby actuating the alarm indicator lamp 78 and an audible alarm transmitted via the loudspeaker 69. At the same time, it inhibits the generation of the next subsequent F feed signal because the latch 75 remains reset and is not set—thereby inhibiting the NAND gate 87.

In one embodiment, the data processor may be programmed to stand by for a predetermined time, for example 30 seconds, awaiting corrective action by the ordering subscriber. The corrective action may include manual retransmission of correct data or removal of the defective order card and manually re-starting the card reader. If corrective action is not taken within the prescribed time, the computer may disconnect the telephone line and erase the portion of the order already received.

Commercial tone dialing signal reception equipment requires that the duration of each tone signal burst last for at least 0.055 seconds, and that the interval between tone bursts be at least 0.045 seconds. Thus, the maximum reading rate is 10 characters per second. The maximum velocity for a card having its aperture rows separated by 0.2 inches is 2 inches per second. In one embodiment, where the card is 5½ inches long and the cards are spaced ½ inch apart in being fed to the reader, a maximum read rate of three seconds per card is allowed. This has been found to provide a reasonble rate, but requires that a subsequent card not be fed until the preceding card has advanced beyond the point to which the subsequent card will be moved by the card feed plunger. To meet this requirement, the card transit timer 94 is used to inhibit the operation of the card feed plunger for the required interval after an EOC signal is detected.

Having thus described in detail a preferred embodiment of the invention, persons skilled in the art will be able to modify certain of the structure which has been disclosed and to substitute equivalent elements for those described while continuing to practice the principle of the invention; and it is, therefore, intended that all such modifications and substitutions be covered as they are embraced within the spirit and scope of the appended claims.

We claim:

1. Apparatus for communicating with a central processor capable of returning "accept" or "reject" signals responsive to the reception of subsets of transmitted data, comprising: a plurality of order cards forming a card order deck, each card bearing machine-interpretable data representaive of a known item and including an End-of-Card character for signaling the end of data thereon; card reader means holding a plurality of preselected ones of said cards and responsive to a feed signal for reading the next card in sequence and for generating first binary signals representative of the data on said card; manually-actuated keyboard means for generating second binary signals representative of data desired to be transmitted to said processor; tone generator circuit means responsive either to said first and second binary signals for generating tone signals representative thereof; acoustic coupler means receiving said tone signals for transmitting the same to a telephone line; first detector means responsive to an "accept" signal from said processor for generating a feed signal to said card reader means to read the next card; second detector means responsive to a "reject" signal from said processor for inhibiting said card reader means from reading said next card; first logic circuit means for controlling the generation of said feed signal to said card reader; detector circuit means for detecting an End-of-Card character being read by said card reader means; timer circuit means for delaying the output of said first detector means for a time sufficient to insure transit of said card being read from said card reading station; and said first logic circuit means being responsive to the output of said timer circuit and to an "accept" signal from said processor for generating said feed signal, whereby said feed signal will be inhibited if an End-of-Card signal is not detected or if an "accept" signal is not received from said processor.

2. The apparatus of claim 1 further comprising an End-of-Order card in said stack, said tone signal generators generating and transmitting an End-of-Order signal in response to the reading of said End-of-Order Card.

3. The apparatus of claim 1 further comprising amplifier circuit means responsive to a microphone of said acoustic coupler, said microphone receiving side tones and received signals in said telephone handset; and a loudspeaker driven by said amplifier means, whereby an operator can determine that signals are being transmitted to said processor and being received from said processor.

4. The apparatus of claim 1 further comprising second detector circuit means for detecting when said indicia on said card other than indicia representative of said End-of-Card indicia is not being sensed; and second logic circuit means responsive to said second detector circuit means and said End-of-Card signal for enabling said End-of-Card detector only when an actual End-of-Order signal is detected and not during an interval between cards.

5. The apparatus of claim 1 further comprising manual reset means for generating a signal to reset said "reject" signal detector means manually.

6. The apparatus of claim 5 further comprising visual indicator means in response to the output of said "reject" signal detector; and audible alarm means for generating an audible signal in response to the detection of a "reject" signal by said "reject" signal detector.

7. The apparatus of claim 1 wherein all of said signals transmitted to and from said processor are tone signals.

8. The apparatus of claim 7 further comprising a latch circuit associated with each of a plurality of said photodetector means and for storing the signals thereof; tone encoder means responsive to said latch circuit means for encoding tone signals responsive to a fixed number of said latch circuit means; and reset loop circuit means responsive to the actuation of a predetermined number of said latch circuit means for resetting the same after a predetermined time, thereby to regenerate bursts of tone signals transmitted to said processor, each burst lasting for a fixed time duration.

9. The apparatus of claim 1 wherein at least one of said cards includes a Stop Order character, and wherein said system further comprises means for detecting a Stop Order character on one of said cards and for generating a Stop Order signal representative thereof, said first logic circuit means being responsive to a Stop Order signal to permit the generation of said feed signal only when a Stop Order signal has not been detected.

10. The apparatus of claim 9 further comprising circuit means for sensing said Stop Order signal and at least one other sensor for insuring that only a Stop Order signal is detected.

11. The apparatus of claim 1 wherein at least one of said cards comprises a Stop Order character, said system further comprising circuit means responsive to the detection of a Stop Order character for inhibiting the subsequent automatic feeding of cards.

12. The apparatus of claim 11 further comprising a manual Stop Order switch connected in circuit with said Stop Order detector to permit the manual generation of a Stop Order signal to inhibit automatic feeding of subsequent cards manually.

13. The apparatus of claim 12 further comprising visual indicator means responsive to a Stop Order signal to indicate to the operator that a Stop Order has been entered.

* * * * *